(12) United States Patent
Raszga et al.

(10) Patent No.: US 9,545,062 B2
(45) Date of Patent: Jan. 17, 2017

(54) INTEGRATED HYDRAULIC SYSTEM FOR HARVESTER

(75) Inventors: Calin Raszga, Dubuque, IA (US); Mark Breutzman, Potosi, WI (US)

(73) Assignee: Deere & Company, Moline, IL (US)

( * ) Notice: Subject to any disclaimer, the term of this patent is extended or adjusted under 35 U.S.C. 154(b) by 1162 days.

(21) Appl. No.: 13/613,169

(22) Filed: Sep. 13, 2012

(65) Prior Publication Data

US 2014/0069554 A1  Mar. 13, 2014

(51) Int. Cl.
*A01G 23/08* (2006.01)
*A01G 23/083* (2006.01)

(52) U.S. Cl.
CPC .............. *A01G 23/08* (2013.01); *A01G 23/083* (2013.01)

(58) Field of Classification Search
CPC .... A01G 23/08; A01G 23/081; A01G 23/083; A01G 23/087; A01G 23/091; A01G 23/093; A01G 23/095
See application file for complete search history.

(56) References Cited

U.S. PATENT DOCUMENTS

| 5,056,312 | A | 10/1991 | Hirata et al. |
| 6,267,163 | B1 | 7/2001 | Holmes |
| 7,415,822 | B1 * | 8/2008 | Harber .................. E02F 9/2232 60/413 |
| 7,677,279 | B2 | 3/2010 | Swinyard et al. |
| 2004/0020561 | A1 | 2/2004 | Brown |
| 2004/0112463 | A1 | 6/2004 | Hicks et al. |
| 2005/0226738 | A1 | 10/2005 | Bergquist |

FOREIGN PATENT DOCUMENTS

WO    WO2011/046536 A1    4/2011

* cited by examiner

*Primary Examiner* — Matthew G Katcoff
(74) *Attorney, Agent, or Firm* — Lorenz & Kopf, LLP

(57) ABSTRACT

A harvester is provided for felling and processing a tree, the harvester including traction devices and a harvester head. The harvester includes an integrated hydraulic system for operating the traction devices and the harvester head. More particularly, the harvester includes an integrated load sense system for operating the traction devices and the harvester head.

6 Claims, 4 Drawing Sheets

INTEGRATED HYDRAULIC SYSTEM FOR HARVESTER

FIELD OF THE DISCLOSURE

The present disclosure relates to forestry equipment and, more particularly, to a tree harvester.

BACKGROUND OF THE DISCLOSURE

To fell and process trees, an operator may use a tree harvester having a harvester head moveably coupled to a wheeled or tracked chassis via a boom assembly. In use, the harvester head grips an upright, growing tree and cuts or fells it. Then, while driving the felled tree trunk longitudinally through the harvester head, the harvester head delimbs branches from the felled tree trunk. The harvester head may also be configured to chop the delimbed tree trunk into shorter pieces with a chain saw or another suitable cutting device. If the harvester head includes an accumulation pocket, the head may also hold multiple felled tree trunks. Finally, the harvester head places the felled tree trunks in bunches on the ground for further processing.

SUMMARY

The present disclosure provides a harvester for felling and processing a tree, the harvester including traction devices and a harvester head. The harvester includes an integrated hydraulic system for operating the traction devices and the harvester head. More particularly, the harvester includes an integrated load sense system for operating the traction devices and the harvester head.

According to an embodiment of the present disclosure, a harvester is provided for felling and processing a tree. The harvester includes a chassis, an engine, a plurality of traction devices positioned to support the chassis, a hydraulic traction actuator that operates at least one of the plurality of traction devices, a harvester head coupled to the chassis, the harvester head including at least one tool that is configured to cut the tree, and a hydraulic head actuator that operates at least one member of the harvester head. The harvester also includes a hydraulic circuit having a pump operatively coupled to the engine to supply pressurized hydraulic fluid, a main valve in communication with the pump and the hydraulic traction actuator, the main valve selectively supplying pressurized hydraulic fluid to the hydraulic traction actuator to operate the at least one traction device, the main valve having a load sense port, and a head valve in communication with the pump and the hydraulic head actuator, the head valve selectively supplying pressurized hydraulic fluid to the hydraulic head actuator to operate the at least one member of the harvester head, the head valve having a load sense port in communication with the load sense port of the main valve to communicate a load sense signal between the main valve and the head valve.

According to another embodiment of the present disclosure, a harvester is provided for felling and processing a tree. The harvester includes a chassis, an engine, a plurality of traction devices positioned to support the chassis, a hydraulic traction actuator that operates at least one of the plurality of traction devices, a harvester head coupled to the chassis, the harvester head including at least one tool that is configured to cut the tree, a hydraulic head actuator that operates at least one member of the harvester head, and a hydraulic circuit in communication with the hydraulic fraction actuator and the hydraulic head actuator, the hydraulic circuit including at most one pump operatively coupled to the engine, the at most one pump supplying pressurized hydraulic fluid to the hydraulic traction actuator to operate the at least one traction device and to the hydraulic head actuator to operate the at least one member of the harvester head.

According to yet another embodiment of the present disclosure, a method is provided for operating a harvester for felling and processing a tree. The harvester includes a chassis, a plurality of traction devices positioned to support the chassis, and a harvester head coupled to the chassis, the harvester head including at least one tool that is configured to cut the tree. The method includes the steps of: receiving a first load sense signal from a hydraulic traction actuator that operates at least one of the plurality of traction devices; receiving a second load sense signal from a hydraulic head actuator that operates at least one member of the harvester head; generating an integrated load sense signal by comparing the first and second load sense signals; and controlling a pump based on the integrated load sense signal, the pump communicating with the hydraulic traction actuator and the hydraulic head actuator to direct pressurized hydraulic fluid to the hydraulic traction actuator and the hydraulic head actuator.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
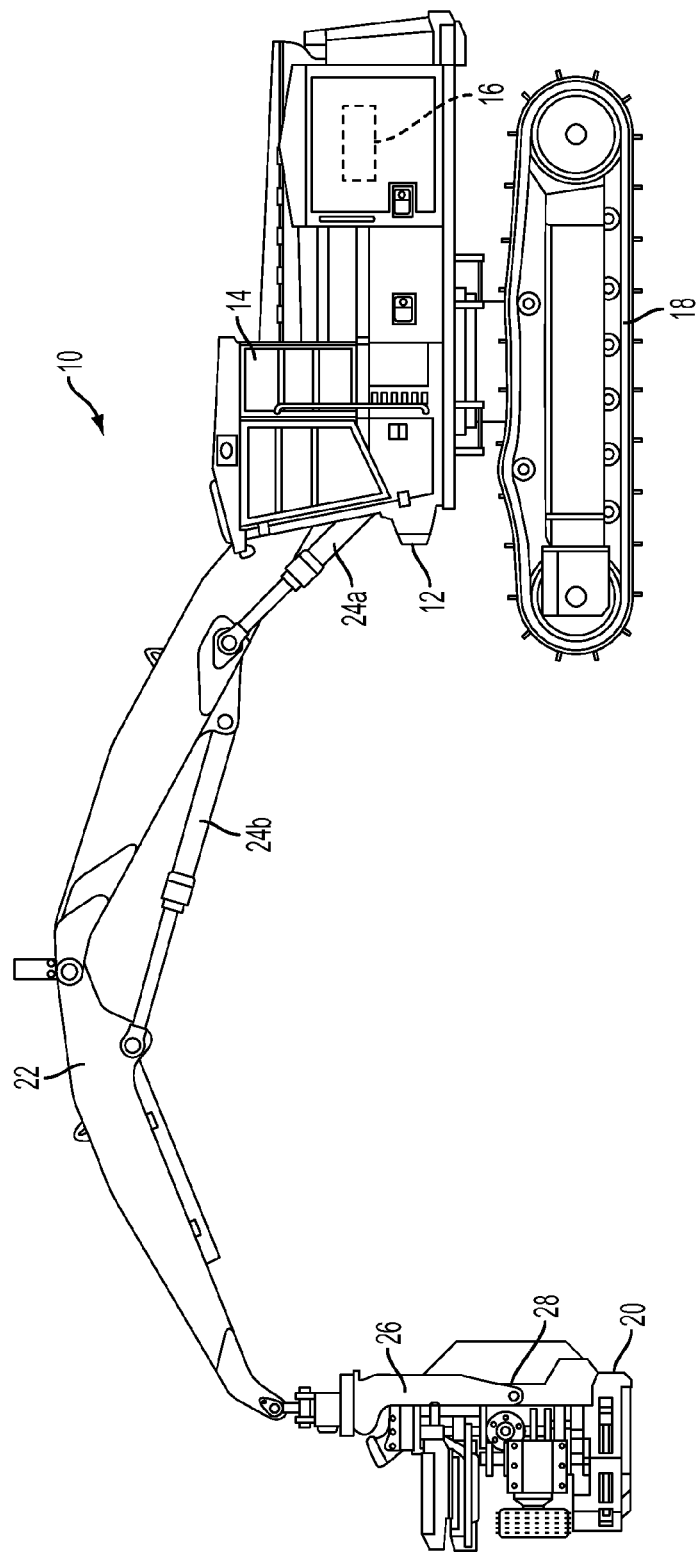
FIG. 1 is a side elevational view of a harvester of the present disclosure, the harvester having a tracked chassis and a harvester head moveably coupled to the chassis.

Referring to FIG. 1, a tracked harvester 10 of the present disclosure illustratively includes a carrier or chassis 12 and an operator cab 14 that houses and protects the operator of harvester 10. Operator cab 14 may include foot pedals, a steering wheel, joysticks, monitors, and other controls (not shown) for operating harvester 10.

Harvester 10 also includes engine 16. Engine 16 may be in the form of an internal combustion engine or an electric engine, for example.

Harvester 10 further includes a plurality of traction devices, illustratively ground-engaging tracks 18, for supporting chassis 12 above the ground. In use, engine 16 drives tracks 18 to propel chassis 12 of harvester 10 across the ground. Although harvester 10 is shown and described herein using tracks 18 as the traction devices, it is within the scope of the present disclosure that other types of harvesters 10 may be used, such as wheeled harvesters that use wheels as the traction devices.

Harvester 10 still further includes a forward-mounted harvester head 20 that is configured to fell and process trees. Head 20 is moveably coupled to chassis 12 via boom assembly 22, which enables head 20 to be raised, lowered, and tilted relative to chassis 12 to position head 20 at a desired position relative to a tree to be felled. First and second hydraulic boom cylinders 24a, 24b, are shown in FIG. 1 for moving boom assembly 22 relative to chassis 12. Head 20 is also moveably coupled to support arm 26 of boom assembly 22. For example, as shown in FIG. 1, head 20 may be positioned upright or vertically on support arm 26 to fell a tree, and then head 20 may be tipped downward or horizontally relative to support arm 26 about axis 28 for further processing of the felled tree, including delimbing and chopping operations. A third hydraulic boom cylinder 24c (FIG. 3) may be provided for moving head 20 about axis 28 relative to support arm 26 of boom assembly 22.

Figure 2:
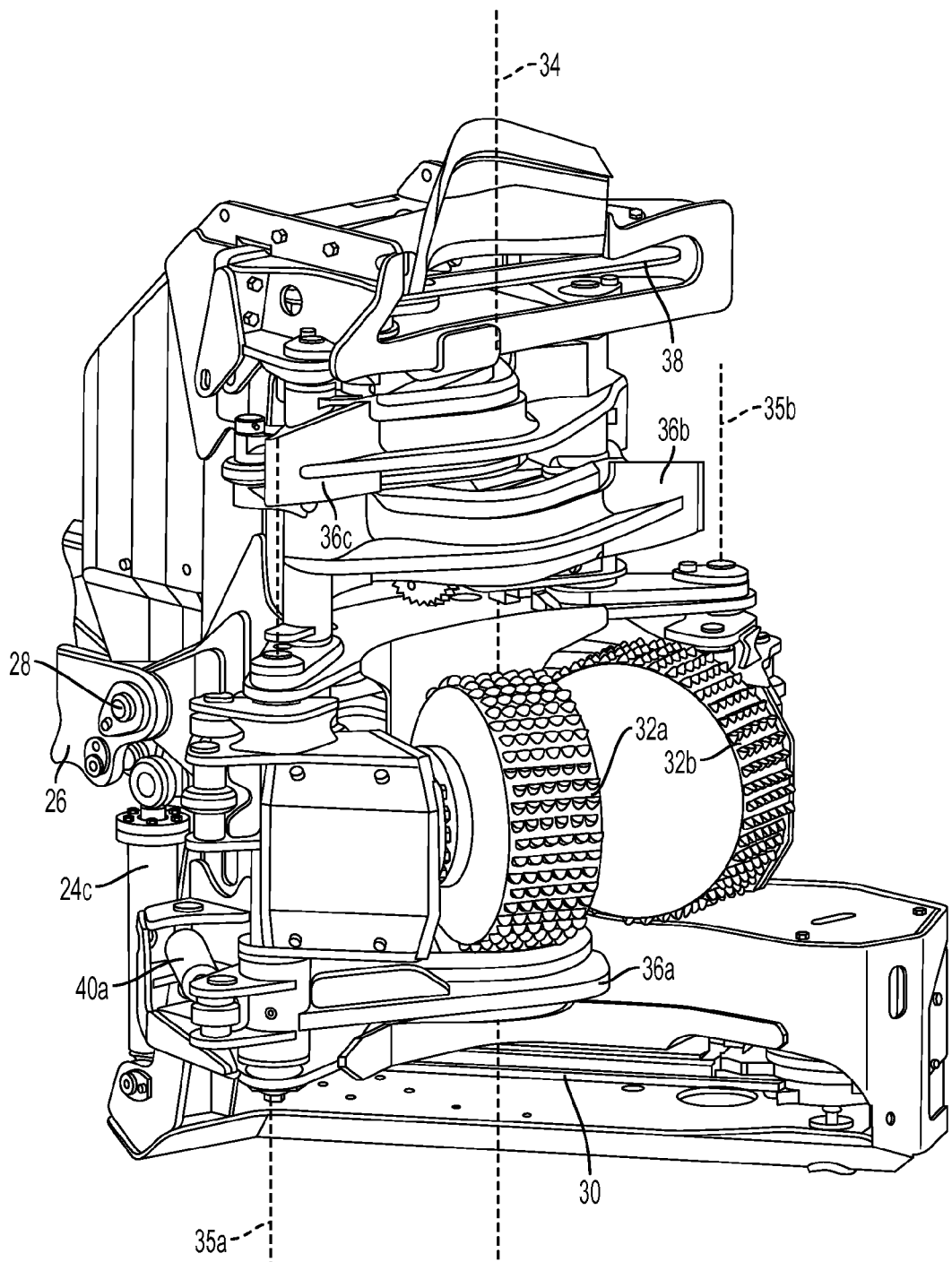
FIG. 2 is a front perspective view of the harvester head of FIG. 1.

Head 20 of harvester 10 is shown in more detail in FIG. 2 and includes various operative members. Head 20 includes a felling saw 30 for felling trees. Head 20 also includes a plurality of rotating drive wheels 32a, 32b, for driving the felled tree trunks along longitudinal axis 34 of head 20 while a plurality of delimbing knives 36a, 36b, 36c, run alongside the felled tree trunks to delimb branches from the felled tree trunks. Head 20 further includes a chopping saw 38 for chopping the felled tree trunks into shorter pieces. In the illustrated embodiment of FIG. 2, felling saw 30 and chopping saw 38 of head 20 are chain saws, but it is also within the scope of the present disclosure that felling saw 30 and/or chopping saw 38 may be rotary blade saws, for example.

Head 20 may be configured to accommodate trees of various sizes. For example, as shown in FIGS. 2 and 3, head 20 includes a plurality of hydraulic head cylinders 40a, 40b, that are configured to selectively open and close drive wheels 32a, 32b, and/or delimbing knives 36a, 36b, 36c, about axes 35a, 35b, to accommodate trees of various sizes.

Figure 3:
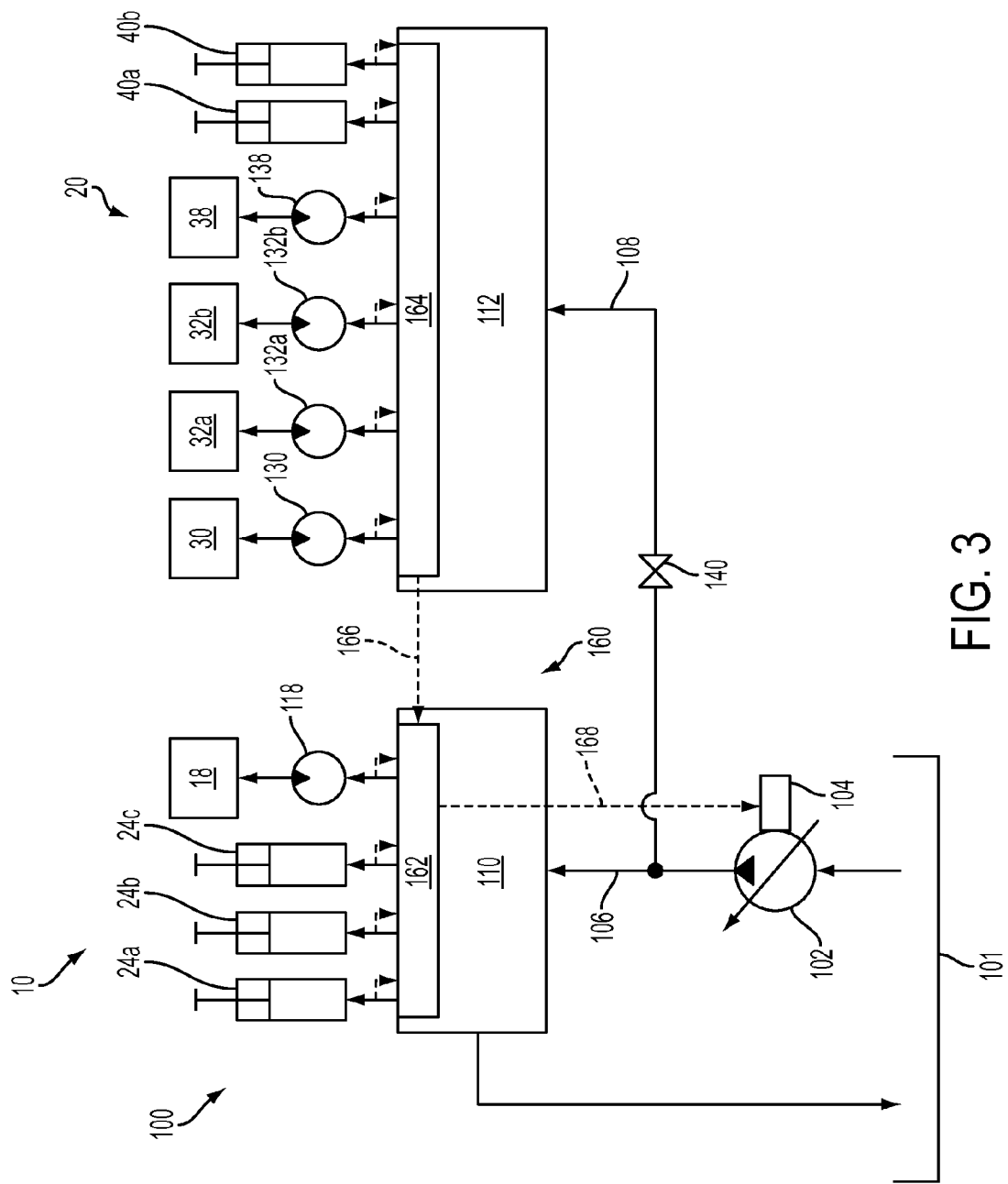
FIG. 3 is a schematic diagram of a first exemplary circuit for operating the harvester of FIG. 1.

Referring next to FIG. 3, a first exemplary circuit 100 is provided for operating harvester 10. Circuit 100 includes pump 102 that is driven by engine 16 (FIG. 1) to deliver pressurized hydraulic fluid from tank 101. An exemplary pump 102 is a variable displacement pump, such as a variable displacement axial piston pump. Controller 104 is provided to control pump 102. For example, if pump 102 is an axial piston pump, controller 104 may be configured to adjust a swash plate angle of pump 102 to control the displacement of pump 102, and as a result, the output flow from pump 102.

Circuit 100 also includes main valve 110 for operating the tracked harvester 10 and head valve 112 for operating head 20. As shown in FIG. 3, pump 102 is configured to supply pressurized hydraulic fluid to main valve 110 via line 106 and to head valve 112 via line 108 in an integrated manner. By using a single pump 102, the operation of engine 16 may be simplified. Operator cab 14 of harvester 10 (FIG. 1) may include suitable controls (not shown), such as push-buttons and joysticks, to allow the operator to control main valve 110 and head valve 112 from inside operator cab 14.

Main valve 110 of circuit 100 may control the supply of pressurized hydraulic fluid to various functions of the tracked harvester 10. For example, in the illustrated embodiment of FIG. 3, main valve 110 controls the supply of pressurized hydraulic fluid to hydraulic boom cylinders 24a, 24b, 24c, for operating boom assembly 22 and to one or more hydraulic track motors 118 for driving tracks 18. It is also within the scope of the present disclosure that main valve 110 may control the supply of pressurized hydraulic fluid to a steering system and/or a braking system (not shown) of the tracked harvester 10.

Head valve 112 of circuit 100 may control the supply of pressurized hydraulic fluid to various operative members of head 20. For example, in the illustrated embodiment of FIG. 3, head valve 112 controls the supply of pressurized hydraulic fluid to hydraulic saw motor 130 for driving the chain of felling saw 30 of head 20, to hydraulic drive wheel motors 132a, 132b, for rotating drive wheels 32a, 32b, of head 20, respectively, and to hydraulic saw motor 138 for driving the chain of chopping saw 38 of head 20. Although saw motors 130, 138, are described herein as driving the chains of felling saw 30 and chopping saw 38, respectively, it is also within the scope of the present disclosure that saw motors 130, 138, may rotate a rotary felling saw blade and/or a rotary chopping saw blade, if applicable. The illustrative head valve 112 of FIG. 3 also controls the hydraulic power delivered to hydraulic head cylinders 40a, 40b, of head 20. Isolation valve 140, which is normally open, may be selectively closed to shut off the supply of pressurized hydraulic fluid to head 20 via line 108, such as when repairing or replacing head 20.

For simplicity, main valve 110 and head valve 112 of circuit 100 are shown in FIG. 3 as being operatively coupled to the head-sides of the corresponding hydraulic boom cylinders 24a, 24b, 24c, and hydraulic head cylinders 40a, 40b. Although not shown in FIG. 3, main valve 110 and head valve 112 of circuit 100 may also be operatively coupled to the rod-sides of the corresponding hydraulic boom cylinders 24a, 24b, 24c, and hydraulic head cylinders 40a, 40b. In this manner, main valve 110 and head valve 112 of circuit 100 may direct pressurized hydraulic fluid to and from the head-sides and/or the rod-sides of hydraulic boom cylinders 24a, 24b, 24c, and hydraulic head cylinders 40a, 40b.

According to an exemplary embodiment of the present disclosure, circuit 100 includes a hydraulic load sense (LS) system 160 (shown in phantom in FIG. 3) that allows controller 104 to control pump 102 in a manner that maintains a designated pressure in circuit 100 while satisfying flow demand. As shown in FIG. 3, main valve 110 includes a first LS shuttle network 162 that is configured to sense pressure drops in circuit 100 to determine the load pressure requested by each actuator coupled thereto and to compare those requests. See, for example, the phantom lines in FIG. 3 from the boom cylinders 24a, 24b, 24c, and track motor 118 to corresponding ports of the first LS shuttle network 162. Also, head valve 112 includes a second LS shuttle network 164 that is configured to measure pressure drops in circuit 100 to determine the load pressure requested by each actuator coupled thereto and to compare those requests. See, for example, the phantom lines in FIG. 3 from saw motor 130, drive wheel motors 132a, 132b, saw motor 138, and head cylinders 40a, 40b to corresponding ports of the second LS shuttle network 164.

In operation, the second LS shuttle network 164 of head valve 112 compares its incoming load pressure requests and sends a head LS signal 166 to a port of the first LS shuttle network 162 of main valve 110, where the head LS signal 166 is indicative of the highest load pressure request sensed by the second LS shuttle network 164. Then, the first LS shuttle network 162 of main valve 110 compares its incoming load pressure requests and sends an integrated LS signal 168 to a LS port of controller 104, where the integrated LS signal 168 is indicative of the highest load pressure request sensed by the first LS shuttle network 162.

As shown in FIG. 3, the first LS shuttle network 162 of main valve 110 receives the head LS signal 166 from the second LS shuttle network 164 of head valve 112. As a result, the highest pressure drop or load pressure request sensed by the first LS shuttle network 162 of main valve 110 may correspond to an actuator that is coupled to main valve 110 (e.g., hydraulic boom cylinders 24*a*, 24*b*, 24*c*, or hydraulic track motor 118), or alternatively, to an actuator that is coupled to head valve 112 (e.g., hydraulic saw motor 130, hydraulic drive wheel motors 132*a*, 132*b*, hydraulic saw motor 138, or hydraulic head cylinders 40*a*, 40*b*). For example, if the operator is operating an actuator that is coupled to head valve 112 (e.g., hydraulic saw motor 130) but is not operating the actuators that are coupled to main valve 110 (e.g., hydraulic boom cylinders 24*a*, 24*b*, 24*c*, and hydraulic track motor 118), the highest pressure drop or load pressure request would correspond to hydraulic saw motor 130. In this example, the head LS signal 166 from the second LS shuttle network 164 would correspond to the load pressure requested by hydraulic saw motor 130, and the integrated LS signal 168 from the first LS shuttle network 162 would also correspond to the load pressure requested by hydraulic saw motor 130. In this manner, the integrated LS signal 168 that is eventually communicated to controller 104 is a combined or integrated signal from both the first and second LS shuttle networks 162, 164.

If the integrated LS signal 168 indicates an increased pressure drop in circuit 100 (i.e., more demand on an actuator), controller 104 may respond by increasing the displacement, or the output flow, from pump 102. On the other hand, if the integrated LS signal 168 indicates a decreased pressure drop in circuit 100 (i.e., less demand on an actuator), controller 104 may respond by decreasing the displacement, or the output flow, from pump 102. In this manner, although two or more valves 110, 112, are hydraulically present in circuit 100, controller 104 and pump 102 behave as if only one valve is hydraulically present in circuit 100. Also, engine 16 (FIG. 1) may only have to drive a single pump 102 to operate both harvester 10 and head 20, which allows for straightforward torque control of engine 16, rather than having to drive one pump to operate harvester 10 and another pump to operate head 20.

Controller 104 may be configured to maintain excess pressure at the outlet of pump 102. In one embodiment, controller 104 adds a desired, excess pressure value to the integrated LS signal 168. For example, controller 104 may add an excess pressure value of 15 bar, 20 bar, or 25 bar to the integrated LS signal 168, and more specifically 20-22 bar to the integrated LS signal 168. The excess pressure value need not be constant, and may vary over time and based on various operating conditions. Because pump 102 will respond to an inflated version of the integrated LS signal 168, the pressure at the outlet of pump 102 will exceed that requested by the integrated LS signal 168. When one or more actuators are operational, the excess pressure at the outlet of pump 102 may account for pressure losses in circuit 100. Even when none of the actuators are operational, the excess pressure at the outlet of pump 102 may provide a system "stand-by" pressure.

Figure 4:
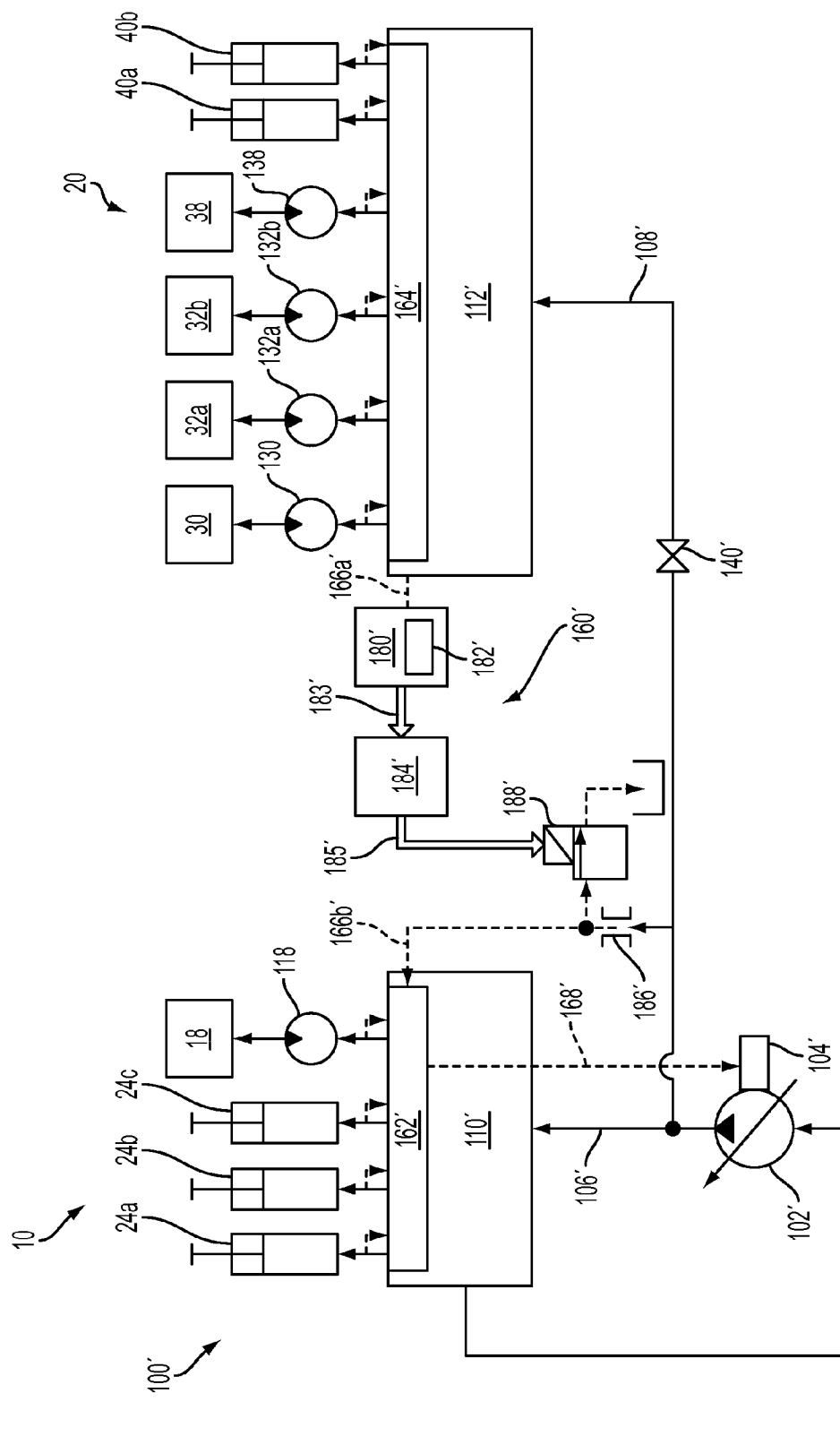
FIG. 4 is a schematic diagram of a second exemplary circuit for operating the harvester of FIG. 1.

A second exemplary circuit 100' is provided in FIG. 4 for operating harvester 10. The second circuit 100' of FIG. 4 is similar to the first circuit 100 of FIG. 3, with like reference numerals indicating like elements, except as set forth herein.

The first circuit 100 of FIG. 3 includes a hydraulic LS system 160, wherein a hydraulic head LS signal 166 communicates between the first and second LS shuttle networks 162, 164. By contrast, the second circuit 100' of FIG. 4 includes a combined electro-hydraulic LS system 160', wherein a first hydraulic head LS signal 166*a*' is converted to an intermediate electronic command signal 185' and then back to a second hydraulic head LS signal 166*b*' between the first and second LS shuttle networks 162', 164'. Compared to the hydraulic LS system 160 of FIG. 3, the electro-hydraulic LS system 160' of FIG. 4 may exhibit fast and reliable communication between the first and second LS shuttle networks 162', 164'. For example, the intermediate electronic command signal 185' of FIG. 4 may exhibit faster travel speed than the hydraulic head LS signal 166 of FIG. 3. This difference in travel speed is noticeable over the long distance between the first and second LS shuttle networks 162', 164', which may exceed 14 meters, for example. Additionally, the electro-hydraulic LS system 160' of FIG. 4 may be less susceptible to temperature differences between the first and second LS shuttle networks 162', 164', the first LS shuttle network 162' having a relatively high temperature due to its close proximity to engine 16 (FIG. 1), and the second LS shuttle network 164' having a relatively low temperature (e.g., near ambient temperature) due to its distance from engine 16 (FIG. 1).

LS system 160' includes an electronic head controller 180' and an electronic machine command center 184'. Head controller 180' may be configured to access a software program 182' for controlling and/or monitoring the operation of head 20. An exemplary software program 182' is the TimberRite™ software program available from Waratah of Peachtree City, Ga. Head controller 180' may be located inside operator cab 14 to allow the operator to control and/or monitor the operation of head 20 from operator cab 14. The LS system 160' of FIG. 4 further includes a hydraulic control orifice 186' in communication with line 108', such that pump 102' supplies pressurized hydraulic fluid to control orifice 186' via line 108', and a hydraulic proportional relief valve 188' in communication with machine command center 184'.

In operation, head controller 180' receives the first head LS signal 166*a*' from the LS shuttle network 164' of head valve 112', where the first head LS signal 166*a*' is indicative of the highest load pressure request sensed by the LS shuttle network 164'. Then, head controller 180' communicates the first head LS signal 166*a*' to machine command center 184' over communication line 183', which may be a controller area network (CAN) line or a wireless communication line, for example. In an exemplary embodiment, communication line 183' accesses software program 182' of head controller 180' to receive the first head LS signal 166*a*'.

Based on the first head LS signal 166*a*', machine command center 184' generates a corresponding electronic command signal 185' and sends the electronic command signal 185' to proportional relief valve 188'. The electronic command signal 185' may be a pulse-width modulation (PWM) signal, for example.

In response to the electronic command signal 185', proportional relief valve 188' modulates its relief pressure. The pressure between control orifice 186' and the LS shuttle network 162' of main valve 110' is adjusted to the relief pressure, with excess pressure above the relief pressure being exhausted from proportional relief valve 188'. Therefore, the LS shuttle network 162' of main valve 110' receives the second head LS signal 166*b*' at the relief pressure of proportional relief valve 188'. In this manner, proportional relief valve 188' uses the intermediate electronic command signal 185' to control the second head LS signal 166*b*' based on the first head LS signal 166*a*'.

The LS shuttle network 162' of main valve 110' senses pressure drops and load pressure requests from the actuators coupled thereto (e.g., hydraulic boom cylinders 24*a*, 24*b*, 24*c*, and hydraulic track motor 118), as well as from the second head LS signal 166*b*'. Then, the LS shuttle network 162' compares the incoming pressure requests and sends an integrated LS signal 168' to a LS port of controller 104', where the integrated LS signal 168' is indicative of the highest load pressure request sensed by the LS shuttle network 162'.

In operation, the pressure in line 108' of circuit 100' may deteriorate due to the relatively long distance separating pump 102' and head valve 112'. By contrast, the pressure in line 106' of circuit 100' may suffer less pressure loss due to the relatively short distance separating pump 102' and main valve 110'. During operation of one or more actuators coupled to main valve 110', controller 104' may maintain excess pressure at the outlet of pump 102' to compensate for general pressure losses in circuit 100', as discussed above with respect to controller 104 of FIG. 3. During operation of one or more actuators coupled to head valve 112', proportional relief valve 188' may work in combination with controller 104' to further increase or supplement the pressure at the outlet of pump 102' to compensate for additional pressure losses in the long line 108' of circuit 100'.

When the first head LS signal 166*a*' indicates a load pressure request at head valve 112', the relief pressure of proportional relief valve 188' may be increased by a desired, excess pressure value over the incoming first head LS signal 166*a*'. As a result, the outgoing second head LS signal 166*b*' will exceed the incoming first head LS signal 166*a*' by the excess pressure value. For example, proportional relief valve 188' may add 5 bar, 10 bar, 15 bar, or 20 bar of excess pressure to the outgoing second head LS signal 166*b*', and more specifically 10-15 bar to the outgoing second head LS signal 166*b*'. The excess pressure value need not be constant, and may vary over time and based on various operating conditions. If the inflated second head LS signal 166*b*' is eventually communicated to pump 102' as the integrated LS signal 168', pump 102' will respond by increasing the pressure at the outlet of pump 102' above that originally requested by the first head LS signal 166*a*'.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A harvester for felling and processing a tree, the harvester including:
   a chassis;
   an engine;
   a plurality of traction devices positioned to support the chassis;
   a hydraulic traction actuator that operates at least one of the plurality of traction devices;
   a harvester head coupled to the chassis, the harvester head including at least one member that operates under hydraulic power;
   a hydraulic head actuator that operates the at least one member of the harvester head; and
   a hydraulic circuit including:
      a single pump operatively coupled to the engine to supply pressurized hydraulic fluid providing all of the hydraulic power for the hydraulic traction actuator and the hydraulic head actuator;
      a main valve in communication with the pump and the hydraulic traction actuator, the main valve selectively supplying pressurized hydraulic fluid to the hydraulic traction actuator to operate the at least one traction device, the main valve having a first load sense shuttle network and a load sense port; and
      a head valve in communication with the pump and the hydraulic head actuator, the head valve selectively supplying pressurized hydraulic fluid to the hydraulic head actuator to operate the at least one member of the harvester head, the head valve having a second load sense shuttle network and a load sense port in communication with the load sense port of the main valve;
      wherein the second load sense shuttle network senses a highest load pressure request for operating the at least one member of the harvester head and communicates a load sense signal to the main valve; and
      wherein the first load sense shuttle network senses a highest load pressure request for operating the at least one traction device and communicates an integrated load sense signal to the pump indicative of a highest load pressure request for operating the at least one traction device and the at least one member of the harvester head; and
   an electronic circuit including:
      a controller operatively coupled to the pump;
      an electronic command device operatively between the load sense port of the main valve and the load sense port of the head valve, the command device converting the load sense signal from a hydraulic signal to an electronic signal; and
      an electro-hydraulic valve operatively between the pump and the main valve that converts the load sense signal from the electronic signal to another hydraulic signal;
      wherein the controller controls the electro-hydraulic valve to modulate pressure from the pump to the load sense port of the main valve at least according to the load sense signal.

2. The harvester of claim 1, wherein the hydraulic traction actuator comprises a hydraulic motor that drives the at least one traction device.

3. The harvester of claim 1, wherein the at least one member of the harvester head comprises at least one tool that is configured to cut the tree.

4. The harvester of claim 3, wherein the at least one tool of the harvester head that is configured to cut the tree includes one of a felling tool, a chopping tool, and a delimbing tool.

5. The harvester of claim 1, wherein the at least one member of the harvester head comprises a drive wheel that is configured to drive the cut tree through the harvester head.

6. The harvester of claim 1, further comprising:
   a boom assembly that moveably couples the harvester head to the chassis; and
   at least one hydraulic boom actuator that operates the boom assembly;
   wherein the main valve selectively supplies pressurized hydraulic fluid to the at least one hydraulic boom actuator to move the boom assembly.

* * * * *